United States Patent [19]
King et al.

[11] Patent Number: 5,694,305
[45] Date of Patent: Dec. 2, 1997

[54] METHOD AND APPARATUS FOR PROTECTION OF ELECTRONIC CIRCUITRY

[75] Inventors: William King, Attleboro; Peter Resca, Braintree, both of Mass.

[73] Assignee: Astrodyne Corporation, Taunton, Mass.

[21] Appl. No.: 705,775

[22] Filed: Aug. 30, 1996

[51] Int. Cl.[6] ............................................. H02M 3/335
[52] U.S. Cl. .................................................. 363/21
[58] Field of Search .............................. 363/19, 21, 23, 363/25; 323/282, 284–287

[56] References Cited

U.S. PATENT DOCUMENTS

| | | | |
|---|---|---|---|
| 4,263,643 | 4/1981 | Koike | 363/19 |
| 4,685,020 | 8/1987 | Driscoll et al. | 363/18 |
| 5,325,282 | 6/1994 | Bansard | 363/21 |
| 5,513,089 | 4/1996 | Sudo et al. | 363/21 |

OTHER PUBLICATIONS

BiCMOS Current–Mode PWM Controller Preliminary Information, MICREL Product Data Sheet, pp. 4–63 undated.

"UC3842/3/4/5 Provides Low–Cost Current–Mode Control", *UNITRODE Integrated Circuits Product & Applications Handbook* 1993–1994, pp. 9–62 to 9–69.

"A New Linear Regulator Features Switch Mode Overcurrent Protection", *UNITRODE Integrated Circuits Product & Applications Handbook* 1993–1994, pp. 9–189 to 9–194.

"Low–Power BiCMOS Current–Mode PWM", *UNITRODE Integrated Circuits Product & Applications Handbook* 1993–1994, pp. 5–319 to 5–322.

"UC3842A Low Cost Start–Up And Fault Protection Circuit", *UNITRODE Integrated Circuits Product & Applications Handbook* 1993–1994, Design Note DN–26, pp. 9–486 to 9–487.

"UC3842A Family Frequency Foldback Technique Provides Protection", *UNITRODE Integrated Circuits Product & Applications Handbook* 1993–1994, Design Note DN–29, p. 9–490.

"Programmable Electronic Circuit Breaker", *UNITRODE Integrated Circuits Product & Applications Handbook* 1993–1994, Design Note DN–30, p. 9–491.

*Primary Examiner*—Matthew V. Nguyen
*Attorney, Agent, or Firm*—Lahive & Cockfield, LLP

[57] ABSTRACT

Protection circuitry incorporates detection circuitry and first and second timer circuits to protect power supply apparatus and associated circuitry from damage due to excessive voltages and/or currents. The detection circuitry initiates the first timer upon detecting potentially damaging voltages and/or currents, caused by, for example, a source or load impedance far different from that for which the power supply apparatus is designed. If the abnormal voltages and/or currents persist for longer than a first period of time, the first timer initiates a second timer that reduces the power output of the power supply apparatus for a second period of time. After expiration of the second period of time, the power supply apparatus returns to normal operation. The cycle described above an repeat indefinitely if necessary to protect against, for example, a sustained short circuit. Incorporation of two timers allows the power supply apparatus to properly power variable loads, such as a motor, that initially draw large current but that do not represent an abnormal load impedance, and to adequately protect the apparatus and associated circuitry from damage.

19 Claims, 4 Drawing Sheets

METHOD AND APPARATUS FOR PROTECTION OF ELECTRONIC CIRCUITRY

TECHNICAL FIELD

This invention relates to electronic apparatus and more particularly to techniques for protecting power supply apparatus and associated circuitry from damage due to exposure to voltage and currents different from those for which the apparatus or circuitry is designed.

BACKGROUND

Electronic circuits can be damaged when connected to a source or to a load having an impedance far different from the one for which the circuit was designed. Typically, such an impedance causes excessive power dissipation that overheats and destroys at least a portion of the circuit. Accordingly, power supply apparatus, such as dc-to-dc converters, ac-to-dc converters, rectifiers and motor controls, typically incorporates protection circuitry to protect the apparatus from, for example, a short circuit load.

Protection techniques known in the art include attaching a heat sink to the apparatus, incorporating constant-current limiting circuitry, and providing foldback circuitry. Such techniques have disadvantages. Heat sinks are bulky and add weight. Constant- current type limiting can dissipate an excessive amount of power in the power supply apparatus. A large heat sink is typically required to safely dissipate this power. The foldback technique "folds back" and hence reduces allowable output current progressively as an increasingly smaller load impedance reduces the output voltage. This can continue until the current reaches a limiting value, typically at zero output voltage, that is smaller than the limited output of the constant-current technique. High power dissipation is thus avoided. However, the graph of the output current as a function of voltage of the apparatus can be multi-valued. That is, there can be more than one voltage for a given current. As a result, the foldback technique can cause the power supply apparatus to "latch up" when powering a load that varies as power is initially applied to the load. Such variable loads include motors and devices that have considerable input capacitance. Basically, the power supply is fooled into supplying the wrong voltage for a given current.

Another problem in powering variable loads is known colloquially in the art as "motor boating" or "hiccuping." Under certain load conditions, the protection circuitry causes the power supply apparatus to alternate uselessly between a limiting mode and a non-limiting mode. "Hiccuping" also can usually occur when applying power to a load whose impedance varies when it is initially receiving power. "Latch-up" and "hiccuping" have a similar effect, namely that the load is not properly powered, and as a result does not operate properly, or is damaged, or both.

Protection of switching-type power apparatus from an abnormal source input or an abnormal load impedance can be especially difficult problem, involving more than coping with the disadvantages discussed above. A switching power supply has an oscillator that varies switching pulses to control the amount of source power switched to an energy storage element, such as an inductor, from which output power is drawn. Typically, a feedback signal from the power apparatus output modulates the duty cycle of the oscillator pulses to regulate output voltage. Further background on switching-type power supply apparatus can be found in *The Art of Electronics*, Second Edition, by Paul Horowitz and Winfield Hill, Cambridge University Press, 1989, pp. 355–368.

Miniaturization of switching power apparatus often requires using higher oscillator pulse frequencies. At higher frequencies, minimum propagation delays through the circuitry are often a significant portion of the duty cycle of the oscillator. Techniques such as cycle-by-cycle current limiting do not adequately protect the circuit, because even when such techniques drive the apparatus to the minimum duty cycle, considerable power is dissipated in the oscillator circuitry. Furthermore, miniaturizing the apparatus reduces the amount of surface area for radiating heat and renders the apparatus even more sensitive to overheating and failure. Frequency foldback, in which the frequency of the switching oscillator is reduced, and variations of under-voltage lock out, are not always sufficient solutions. Such techniques are often either minimally effective in protecting the circuitry from abnormal load conditions, or are limited in operating frequency and hence limit further miniaturization.

The present invention has several objects and purposes to address the shortcomings of prior art methods and apparatus discussed above.

Accordingly, it is an object of this invention to provide methods and techniques for protecting electronic circuits from abnormal source or load impedances.

It is a further object of the invention to provide methods and techniques for reducing the tendency of power supply apparatus to fail to power adequately a load whose impedance varies upon initial application of power to the load.

Another object of the invention is to provide techniques and methods for protecting switching power apparatus from a short circuit load impedance.

Other general and specific objects of the present invention will be apparent and evident from the accompanying drawings and the following description.

SUMMARY OF THE INVENTION

According to the present invention, power supply apparatus and associated circuitry are protected from damage due to excessive voltages and/or currents. Such voltages and currents often occur when power supply apparatus is connected to a load or source having an impedance far different from the one for which the apparatus is designed. The invention reduces the likelihood of damage to the power supply apparatus and associated circuitry from such abnormal source and load impedances, yet allows the power supply apparatus to supply adequate power to a variety of variable loads, particularly loads that vary when initially powered. Furthermore, the invention minimizes the occurrence of "hiccuping" and "latch-up."

The invention is particularly useful in protecting switching-type power supplies, wherein oscillator pulses periodically switch power to an energy storage component, typically an inductor, for short intervals. Stored energy is transferred to an output conditioning circuit, typically including a filter capacitor, which smoothes the output power provided to a load. The oscillator controls the power delivered to the load by varying the pulses in response to at least one feedback signal representative of the power delivered to the load. Typically, the oscillator varies duty cycle of the pulses.

According to one feature, the invention includes a detection and first timing circuit and a second timing circuit. The detection circuit monitors a first signal representative of the power delivered to the load. When the signal exceeds a known range, indicating that potentially damaging currents and/or voltages are likely present in power supply apparatus or associated circuitry, the detection circuit produces a detection output signal, initiating a first timer. If the first signal is continuously excessive for a first period of time, the first timer generates a different second signal, initiating a second timer. The second timer then reduces or terminates the power output of the power supply apparatus for a second period of time.

According to another aspect of the invention, the power supply apparatus returns to normal operation after expiration of the second period of time. If the detection circuit detects that the first signal,-representative of the power delivered to the load, is again outside a known range, the detection and first timer and second timer operations described above repeat. The apparatus of the invention can be designed to cycle indefinitely in this manner, and alternatively to terminate operation of the power supply apparatus after a selected number of first and second timer cycles. The scope of the invention encompasses such indefinite cycling and such termination after a finite number of cycles.

According to another feature of the invention, the power supply apparatus returns to normal operation if the first signal returns to an acceptable value within the first time period. Thus the second timer is not started upon every excursion of the first signal outside the known range. The likelihood of "hiccuping" is thus minimized.

The use of two separate time periods limits power dissipation in the power supply apparatus and in associated circuitry to safe levels, yet allows the power supply apparatus to start variable loads, such as disc drive motors and capacitive loads. Factors to be considered in determining the lengths of the first and second time periods include the ability of the power supply apparatus to dissipate heat, the nature of the load, and the nature of the source. Those skilled in the art will appreciate the engineering considerations that determine appropriate first and second periods of time. Typically, though not necessarily, the second time period exceeds the first. According to one preferred practice of the invention, the second period of time is approximately ten times larger than the first period of time.

Switching power supply apparatus typically incorporate an error amplifier. The error amplifier produces an output proportional to the difference between a reference voltage and a feedback signal. The oscillator varies the pulses in response to the error amplifier output. According to another aspect of the present invention the first signal representative of the power delivered to the load is the error amplifier output.

Those skilled in the an will appreciate that the error amplifier output is but one means for monitoring the performance of the power supply apparatus. Other signals derived from other portions of the circuit can be used to detect when an improper impedance is attached as a load or to detect when excessive voltages or currents are present in the power supply apparatus or in associated circuitry. The use of another such signal, representative of the power delivered to the load or of the power output or dissipation of the power supply apparatus, is deemed within the scope of the invention.

According to another feature of the invention the first timing circuit includes at least one resistor and a capacitor, and the first time period is determined in pan by the resistor and capacitor.

It is also a feature of the invention that the detection circuit includes a voltage divider and a transistor switch. The voltage divider supplies a reference voltage to the base of the transistor switch. When the error amplifier output, connected to the emitter of the transistor, exceeds the base voltage by a predetermined amount, the transistor switches on and charges the resistor and capacitor circuit of the first timer. As known in art, a comparator may be substituted for the divider and switch, and is deemed within the scope of the invention.

In another aspect of the invention, the second timer includes a one-shot, or monostable, multivibrator timer component for producing a reducing pulse of a duration substantially equal to the second period of time. The one-shot is in electrical communication with the error amplifier such that the reducing pulse reduces the output of the error amplifier for the duration of the reducing pulse. This action reduces the output of the power supply apparatus for the duration of the reducing pulse. Those skilled in the art will appreciate use of a one shot, or monostable, timer component is not the only technique for reducing the output of the power supply apparatus for a second period of time. Other timing control techniques are within the scope of the invention.

Power supply apparatus often incorporates soft start circuitry for limiting the rate at which power is initially delivered to a load. According to another feature of the present invention, soft start circuitry is incorporated into the power supply apparatus. Soft start circuitry typically includes a capacitor charged by the error amplifier output upon initial application of power to the power supply apparatus. However, such a soft start circuit typically will not again limit load power until the power supply apparatus is shut down and restarted. Accordingly, the present invention incorporates, in addition, a soft recovery circuit that reduces the rate at which power is supplied to the load upon return to the first mode of operation upon expiration of the second period of time. In one aspect of the invention, the soft recovery circuit includes a diode for discharging the soft start capacitor during the duration of the reducing pulse generated by the one shot circuit.

It is known in the art that switching-type power supply apparatus can include dc-dc converters, ac-dc converters, motor controls and voltage regulators. Such apparatus can be further characterized as step-up, step-down, inverting or dual polarity. Many of these designs employ an integrated circuit known in the art as a Pulse Width Modulator (PWM) to generate and control pulses. The PWM is available from many manufacturers and is well known in the art. Accordingly, the invention described herein can be incorporated into a PWM integrated circuit, either in whole or in part, for protecting the PWM or associated circuitry. The scope of the invention is thus deemed to include any electronic design that uses a PWM chip. As appreciated by those of ordinary skill in the art, a PWM chip can readily include detection and first timing and second timing circuitry.. Alternatively, a portion of the circuits provided by the invention could be incorporated the PWM and remaining functions could be implemented in the circuit in which the PWM is used. All such uses are deemed to be within the scope of the invention.

In a first mode of operation, the PWM or power supply apparatus typically adjusts the duty cycle of the pulses, in accordance with a feedback signal, to regulate the power delivered to the load. Varying the duty cycle of the pulse is but one method for controlling power delivered to the load. For example, the pulse frequency can be varied, instead of the duty cycle. Similarly, different feedback schemes are known, such as voltage-mode control and current-mode control. The present invention is not limited by the type of pulse or feedback technique used to regulate the power delivered to a load. The invention instead employs a first signal representative of the power output of the power supply apparatus or of the power delivered to the load, detection and timer circuits, and circuitry for reducing the power output of the power supply apparatus. Therefore, numerous feedback and pulse variation techniques are applicable and deemed within the scope of the invention. An integrated circuit oscillator that generates pulses by a technique other than PWM, such as, for example, by varying the frequency of the pulses, and that incorporates detection, first timer and second timer circuitry as described herein, is deemed within the scope of the invention. It is further noted that the reduced power output mode described above includes eliminating the power supply apparatus output, for example by suppressing the generation of oscillator pulses, for all, or for a portion of, the second time period.

The above and further features of the invention are set forth with particularity in the claims and will be understood from consideration of the following description of illustrative embodiments with reference to the accompanying drawings.

BRIEF DESCRIPTION OF THE DRAWINGS

For fuller understanding of the nature and objects of the invention, reference is made to the following detailed description and the accompanying drawings, in which.

DESCRIPTION OF ILLUSTRATED EMBODIMENTS

Figure 1:
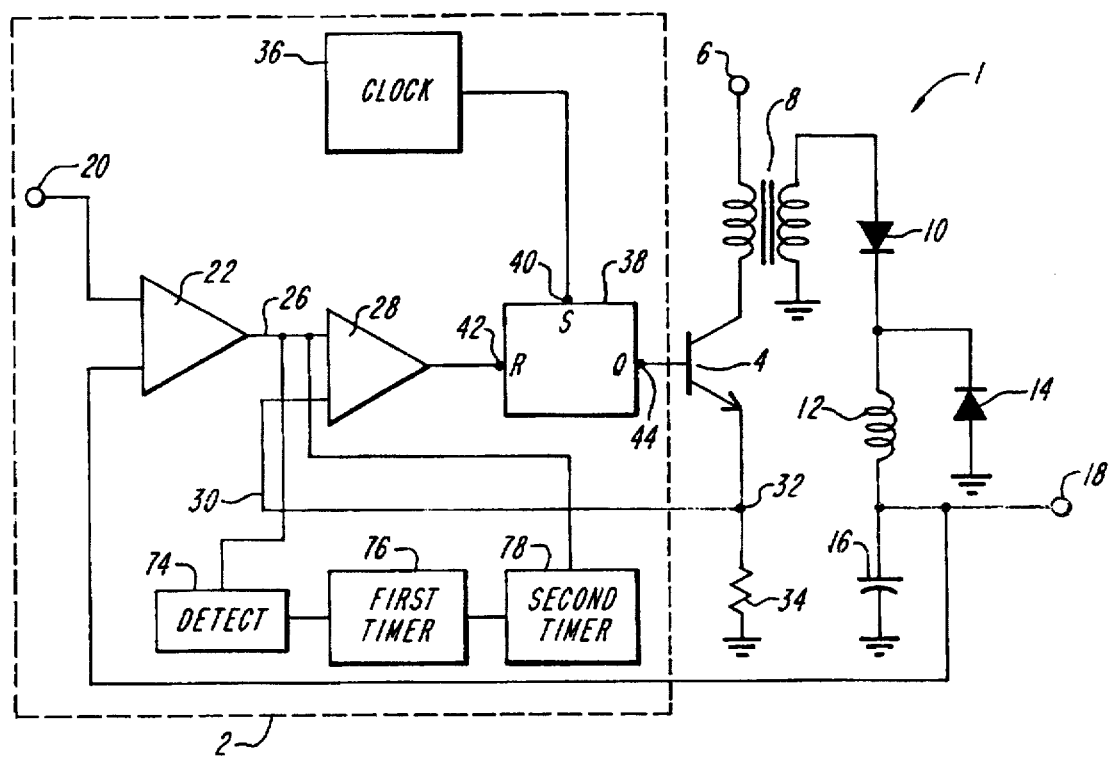
FIG. 1 is an electrical schematic illustrating the major components of a switching-type power supply according to the invention.

FIG. 1 illustrates the major circuit components of a switching-type power supply apparatus 1 according to the invention. An oscillator component 2, typically a PWM integrated circuit, generates pulses that are applied to the base of a transistor switch 4. Each pulse momentarily turns on the transistor switch 4, causing current in the primary winding of transformer 8. The secondary of transformer 8 is connected by a diode 10 to energy storage elements inductor 12 and capacitor 16. During a pulse, there is a current from the secondary of transformer 8, through diode 10 and inductor 12 to capacitor 16. Upon termination of the pulse, the magnetic field in inductor 12 collapses, generating a voltage that, due to the blocking action of diode 10 and the conduction of diode 14, continues to charge capacitor 16. Output voltage at terminal 18 is the voltage cross capacitor 16. Capacitor 16 serves as a smoothing or output conditioning capacitor to reduce the ripple in the output voltage at terminal 18. A switching type power apparatus 1 is very efficient, because power is drawn only as needed from the input power source (not shown).

Power supply apparatus 1 normally operates in a first mode wherein the pulses supplied to switch 4 are varied in response to feedback signals to control the power delivered to a load connected to output terminal 18. Apparatus 1 functions as follows: Error amplifier 22 continuously generates an error signal 26 based on the difference between a reference voltage applied to terminal 20 and the actual output voltage at terminal 18, as sensed along feedback path 24. Meanwhile, each clock signal initiates generation of a pulse by latch 38. Each pulse causes a linearly increasing current through the primary of transformer 8, which in turn creates a concomitant increasing voltage drop in sense resistor 34. The voltage across sense resistor 34 is fed via path 30 as an input to comparator 28; the error signal 26 is the other input. When the voltage across sense resistor rises such that it equals the error amplifier signal 26, comparator 28 changes output, causing latch 38 to terminate the pulse. Thus a large error signal 26 creates a longer pulse, and hence more power to be delivered to the load, because it takes a longer time for the voltage across sense resistor 34 to rise to equal the error signal 26. Components 74, 76 and 78 are described in a subsequent section.

Figure 2:
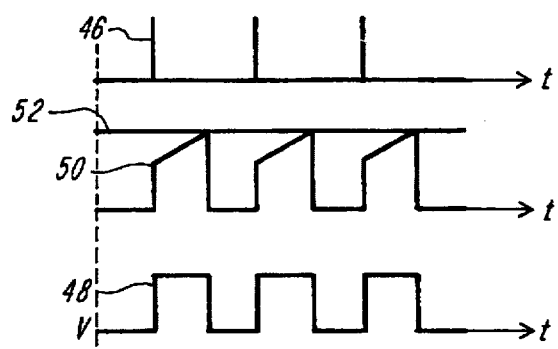
FIG. 2 is a timing diagram illustrating the generation of pulses by the oscillator component of the switching-type power supply of FIG. 1.

Such operation is typical of the PWM technique, and is illustrated in the timing diagram of FIG. 2. Clock pulses 46 initiate pulses 48 that are delivered to the base of transistor 4 by latch 38. Pulses 50 are the voltage across sense resistor 34. When the voltage across sense resistor 34 reaches the error signal voltage 52 comparator 28 changes output causing latch 38 to terminate the pulse.

The invention operates the power supply in a second, or reduced power, mode of operation for a second period of time to prevent excessive voltages and/or currents from damaging the power supply apparatus or associated circuitry. The first mode described above, especially a higher frequencies, does not always provide adequate protection, mainly due to delays in signal transmission within the power supply apparatus. For example, if a short is suddenly presented at output terminal 18, error amplifier output signal 26 maximizes due to the large difference between the reference voltage 20 and 0 volts at the output. Current in the primary of transformer 8 will rise such that the voltage across sense resistor 34 reaches the maximum comparator 28 will allow before terminating the pulse, typically one volt. However, due in part to signal propagation delays, this process takes time. At higher frequencies the delay is such a large portion of the duty cycle of the pulses that considerable power can be dissipated in components such as transformer 8, diodes 10 and 14, and inductor 12, as well as in oscillator component 2. Many of the aforementioned components will typically be damaged fairly quickly. Thus, the normal, or first, mode of operation is not always adequate to protect against abnormal load impedances.

Figure 3:
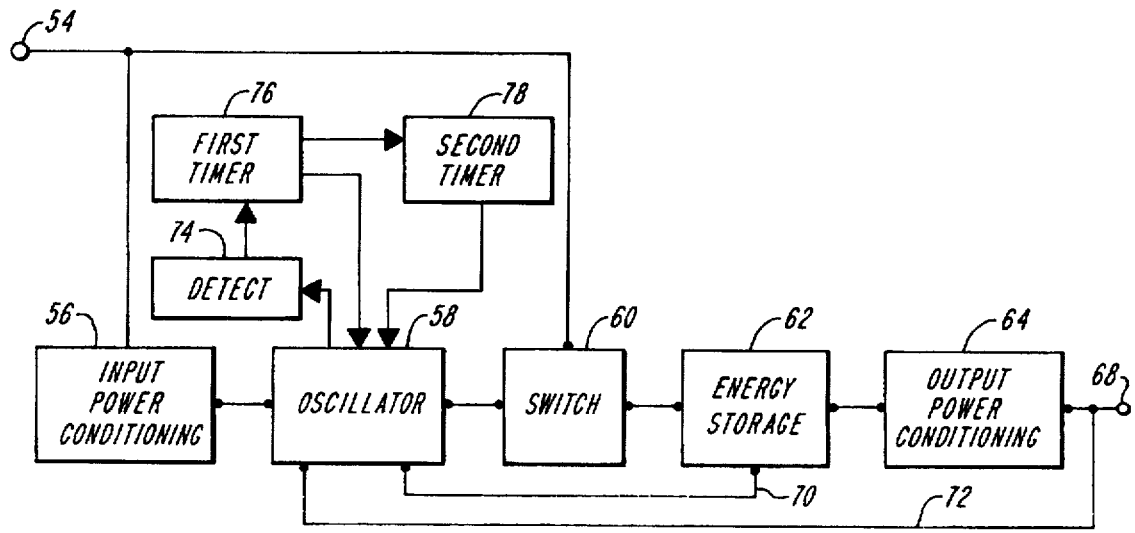
FIG. 3 is a block diagram of a switching-type power supply apparatus according to the invention.

FIG. 3 is a block diagram of a switching type power supply apparatus, such as a dc-dc converter, incorporating protection circuitry according to the invention. Input power is applied at terminal 54. Input power conditioning block 56 typically includes filters for reducing noise and low power regulated voltage supplies for powering other circuits such as oscillator 58. Oscillator 58, switch 60 and energy storage component 62 can operate as described above in the discussion of FIG. 1. Output conditioning block 64 can include filter capacitor 16 in FIG. 1 and also other filter components designed to lessen noise and reduce output ripple. Power is drawn from output terminal 68. Current and voltage feedback signals are provided to oscillator 58 along feedback path 70 and 72 respectively.

Figure 4:
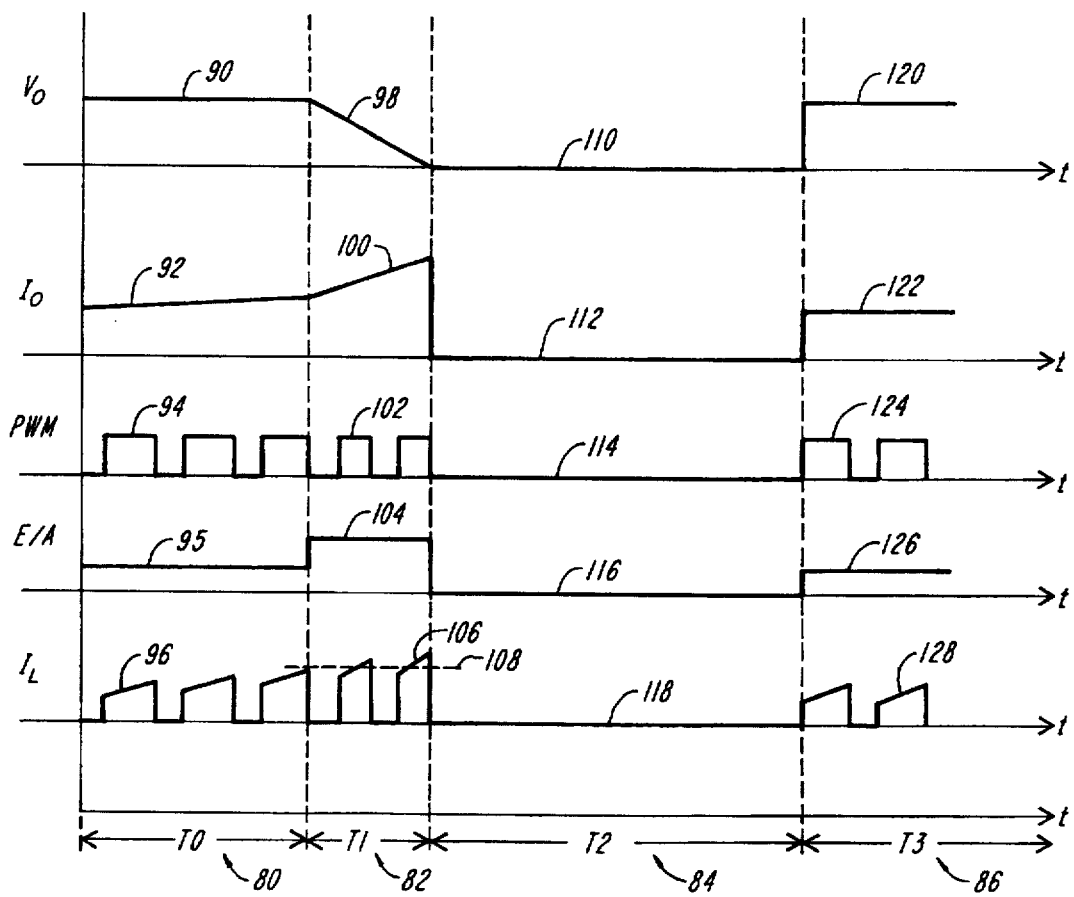
FIG. 4 is a timing diagram illustrating operation of the invention in FIGS. 1 and 3.

Detection circuitry 74 detects the existence of potentially damaging voltage or currents. Detection circuit 74 sends a detection output signal to first timer 76. First timer 76 times the length of time this detection output signal exists. Should the detection output signal exist for a first period of time, indicating the continued existence for the first period of time of the excessive voltages or currents, first timer 76 generates a second signal. Responding to this second signal, second timer 78 reduces the power output of oscillator 58 for a second period of time. After expiration of the second period of time the power supply apparatus returns to normal operation. Should the fault still occur the whole detect first timer and second timer cycle repeats again. Note that if during the first period of time the excessive voltages or currents should be reduced, first timer 76 does not send the second signal to second timer 78 and the power supply apparatus is not shut down for the second period of time. Operation in this fashion allows the circuit to power up variable loads, such as motors, without reducing the power output for the second period of time FIG. 4 is a timing diagram illustrating operation of the invention. During initial time period T0, indicated by reference numeral 80, the power supply apparatus functions normally. Output voltage 90 is fairly only slightly. Oscillator pulses 94 are fairly uniform and error output amplifier output signal 95 is constant, at about half its maximum value. Oscillator pulses 94 terminate when current sense resistor voltage 96 increases to equal the error amplifier voltage.

In response to an overload or fault at the output occurring at the beginning of time period T1, time period T1 being indicated by reference numeral 82, output voltage 98 drops precipitously. Accordingly, output current 100 increases significantly. The error amplifier output 104 doubles, increasing to its maximum. The voltage 106 across the sense resistor (34 in FIG. 1) rises above the maximum value 108 allowed by the oscillator comparator 58, at which point each pulse 102 is terminated. However, note that pulses 102, though narrower than normal operation pulses 94, still have a finite width. The power supply apparatus can only operate for a limited period of time under these conditions before it is destroyed.

However, at the beginning of time period T1 detection circuit 74, sensing that the error amplifier output exceeds a set, or known, range, produces a detection output signal, starting first timer 76 in FIG. 3. Upon the expiration of time period T1, second timer 78 reduces the power output of the power supply, in this case to zero, for a second period of time T2, as indicated by reference numeral 84. The output voltage 110, output current 112, and the voltage 118 across the sense resistor are all zero. Oscillator pulse output 114 is eliminated.

After expiration time period T2, the power supply apparatus starts up again and attempts normal operation. The output voltage 120 returns to normal, the output current 122 is acceptable, and oscillator pulses 124 are again normal. Error amplifier output voltage 126 is acceptable. Should the short circuit re-occur, the cycle described repeats.

Figure 5:
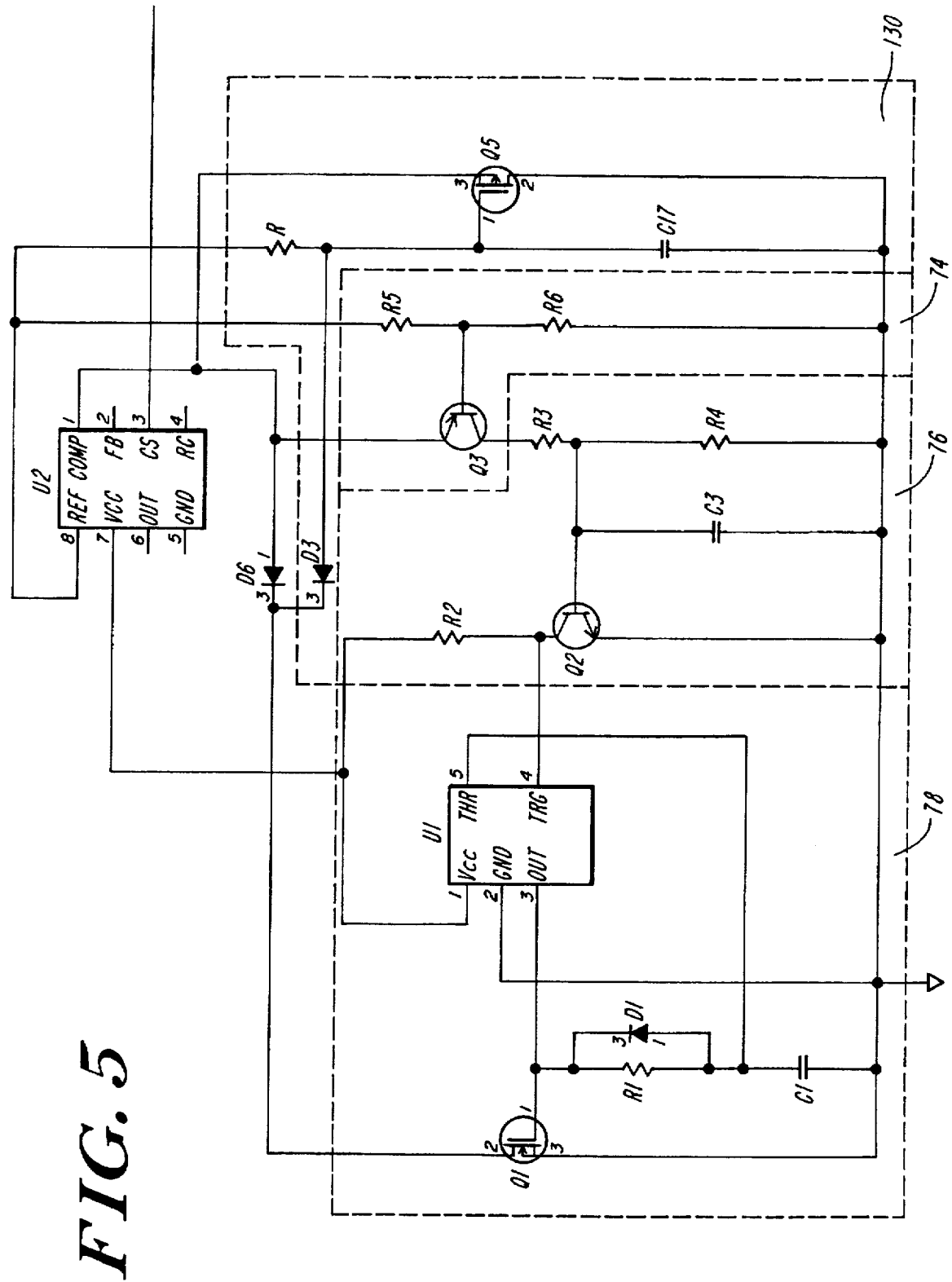
FIG. 5 is a partial schematic illustrating one embodiment of the invention illustrated in FIG. 3.

FIG. 5 is a partial schematic illustrating one embodiment of the invention. For clarity, only those portions, of a switching-type power supply, with which the detector 74, first timer 76 and second timer 78 interact are shown. Also illustrated are soft start and soft recovery circuitry 130.

Pulses are generated by PWM integrated circuit U2. Such chips, and their typical pin configurations are well known in the art. A suitable integrated circuit is the Micrel 38HC43.

Detection circuitry 74 includes resistors R5 and R6 and switch Q3. The voltage divider formed by resistors R5 and R6 provides a reference voltage to the base of transistor Q3, and derives power from a reference pin on PWM U2. The emitter of transistor switch Q3 is connected to the compensation pin of PWM U2. The compensation pin, as is known by those skilled in the art, is connected to the output of the error amplifier internal to PWM U2 and to an input of a comparator (not shown), such as comparator 28 if FIG. 1. Thus, when the error amplifier 22 internal to chip U2 drives the compensation pin to near its maximum voltage, indicating that excessive voltages or currents are likely to follow, transistor Q3 is biased on, and supplies a detection output voltage to first timer circuit 76.

First timer circuit 76 includes resistors R3 and R4, capacitor C3 and transistor switch Q2. The detection output signal supplied from transistor switch Q3 charges capacitor C3 through resistor R3. Resistors R3, R4 and capacitor C3 determine the first time period, in accordance with engineering principles known to those of ordinary skill. Should the output of the error amplifier of PWM chip U2 remain high long enough for capacitor C3 to charge to a sufficient voltage, transistor Q2 will be biased on and will provide a second signal to the second timer circuitry 78.

The second signal from transistor Q2 is directed to a trigger input of a timer U1, typically a 555 timer well known in the art. This timer is designed to operate in the one shot, or monostable mode, producing a pulse in response to the trigger input from transistor Q2. Q1 inverts this signal from U1 such that a low signal is then supplied, for the duration of the monostable reducing pulse, to the compensation pin output pin of PWM integrated circuit U2. Forcing the compensation pin low eliminates the pulses generated by PWM chip U2 for the second period of time. The duration of the monostable pulse, and hence the length of the second time period, are determined by components R1 and C1 of second timer 78. Typically, second timer 78 cannot be reset until after the expiration of the second period of time.

After expiration of the second period of time PWM chip U2 returns to producing pulses that are supplied to switch component 60 (not shown). Should the short occur again the whole cycle can repeat. If, however, an abnormal load impedance returns to normal before the expiration of time period T1, capacitor C3 does not charge sufficiently to turn on transistor Q2, and the monostable 555 U2 is not triggered. The power supply apparatus simply continues to function, with pulses typically varied in accordance with the voltage across sense resistor 34 and error amplifier 28 output. (Both shown in FIG. 1).

Circuit elements 130 comprise soft start and soft recovery components. Upon initial application of power to the dc-dc converter, semiconductor Q5 holds the compensation pin of PWM U 1 low, slowly allowing the voltage on the compensation pin to rise as capacitor C 17 charges. The pulse output of U 1 therefore is slowly increased. Diode D3 discharges capacitor C 17 during the second time period, therefore requiring capacitor C 17 to charge again after expiration of the second time period. Diode D3 therefore causes a "soft recovery" behavior.

Figure 6:
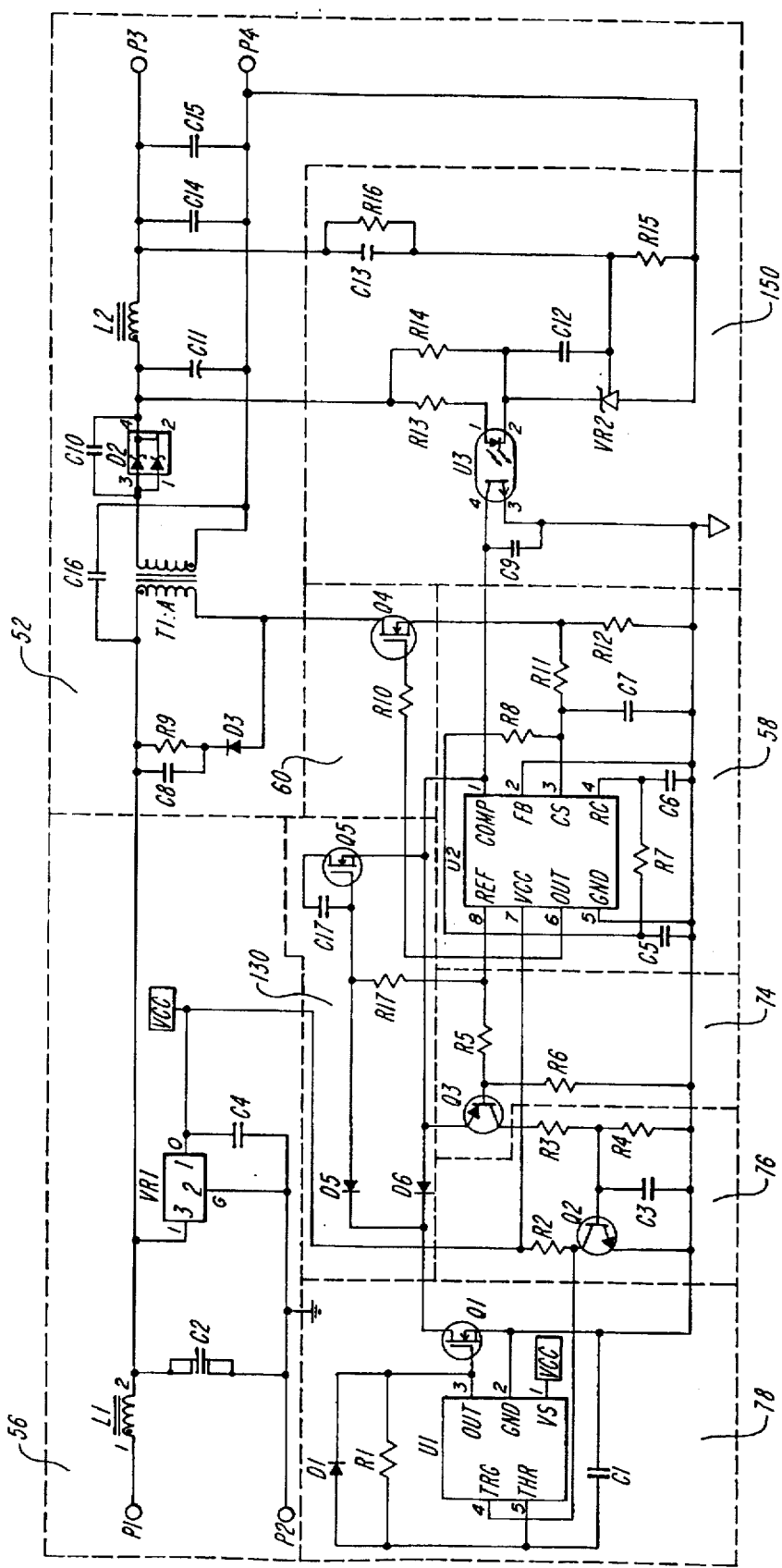
FIG. 6 is an electrical schematic of a six watt dc-dc converter according to the invention.

FIG. 6 illustrates a complete 6 watt dc-dc converter incorporating the invention, including soft start and soft recovery circuitry. Those of ordinary skill in the art, possessed of the foregoing teachings, will appreciate the function of the circuitry illustrated in FIG. 6. Accordingly the following discussion of FIGURE 6 is an overview.

Block 56 comprises input power conditioning circuitry for providing power to the integrated circuits U 1 and U2, and for filtering noise. Circuit elements 52 comprise output power conditioning and energy storage elements, corresponding to blocks 62 and 64 in FIG. 3.

Pulses are generated by oscillator circuitry 58 that includes a PWM integrated circuit U2. Pulses are supplied to switching circuitry 60, which supplies energy to energy storage and output conditioning elements 174.

Detection circuitry is indicated by reference numeral 74; first timer circuitry is indicated by reference numeral 76; and second timer circuitry indicated by reference numeral 78. Integrated circuit U1 is a 555 timer, as described in the foregoing discussion of FIG. 5. Circuit elements 130 comprise soft start and soft recovery components.

Note that circuit elements 150 comprise an external error amplifier. External error amplifier 150 includes a voltage divider formed by R15 and R16 for providing a reference signal; programmable reference VR2; and photonic coupler U3. The external error amplifier 150 serves a similar function to that of error amplifier 22 described the discussion accompanying FIG. 1. The external error amplifier is connected to the compensation pin of U2 and controls the level of voltage on this pin accordingly.

Note that the term first mode, or normal, operation, as used herein, is not limited to the current-mode pulse width control technique described in discussing FIGS. 1-6. First mode applies to all techniques for varying pulse energy in accordance with feedback signals. Other techniques include voltage mode control, variation of the pulse frequency, and the use of dual threshold values for the voltage across the current sense resistor 34 in FIG. 1, wherein a second threshold, typically above the normal 1 volt threshold for comparator 28, is used to further limit pulse energy.

Described in the foregoing FIGS. 1-6 are particular circuits embodying the invention. It will be apparent to those of ordinary skill in the art that the foregoing FIGS. 1-6 are only examples; there can be variations to the circuits illustrated in FIGS. 1-6, for example, including using more or less than all the circuit elements shown, modifying one or more of the components, or using the invention in a power supply apparatus other than the dc-dc converter depicted in FIG. 6, without departing from the spirit or scope of the invention. These variations are therefore considered a part of the present invention. Because certain changes may be made in the circuits described above without departing from the scope of the invention, it is intended that all matter contained in the above description and shown in the accompanying drawings be interpreted as illustrative and not an limiting sense.

It will thus be seen that the invention efficiently obtains objects set forth above among those made apparent from the preceding description.

It is also to be understood that the following claims are intended to cover generic and specific features of the invention described herein and all statements of the scope of the invention which as a matter of language might be said to fall therebetween.

Having described the invention, what is claimed as new and secured by Letters Patent is:

1. In electrical power supply apparatus for connection to an electrical input power source and for controlling the power delivered to a load, said apparatus having an oscillator component controlling the power delivered to the load by generating pulses that vary in a first mode of operation in response to at least one feedback signal representative of the power delivered to the load, the improvement comprising first means for detecting when a first signal representative of the power delivered to the load is outside a known range and for producing a detection output signal indicative thereof and for generating a second electrical signal responsive to the duration of said detection output signal and indicative of said first signal remaining outside said known range for a first period of time, and second means, in electrical communication with said first means and responsive to said second signal for operating the power supply apparatus in a reduced power output mode for a second period of time.

2. In electrical power supply apparatus for connection to an electrical input power source and for controlling the power delivered to a load, said apparatus having an oscillator component controlling the power delivered to the load by generating pulses that vary in a first mode of operation in response to at least one feedback signal representative of the power delivered to the load, the improvement comprising first means including detection means for detecting when a first signal representative of the power delivered to the load is outside a known range and for producing a detection output signal indicative thereof, said first means further including first timing means, in electrical communication with said detection means and responsive to the duration of said detection output signal, for generating a second electrical signal indicative of said first signal remaining outside said known range for a first period of time, and second timing means, in electrical communication with said first timing means and responsive to said second signal, for operating the power supply apparatus in a reduced power output mode for a second period of time, and for normally returning, after expiration of said second period of time, said power supply apparatus to the first mode of operation.

3. In apparatus according to claim 2, the further improvement wherein said detection means comprises voltage divider means for generating a divided signal and switch means, said switch means being responsive to said divided signal and to said first selected signal, for providing said detection output signal to said first timing means.

4. In the apparatus according to claim 2, the further improvement wherein said detection means comprises comparator means for comparing said first selected signal to a reference signal and for providing said detection output signal to said first timing means when said first selected signal is outside said known range.

5. In apparatus according to claim 2, the further improvement wherein the oscillator component has an error amplifier and said first signal comprises the output of the error amplifier component.

6. In apparatus according to claim 2, the further improvement wherein said first timing means includes a resistor element, a capacitor element and a switch element, said detection output signal charging said capacitor element through said resistor element, and said switch element, in electrical communication with said capacitor element, providing said second signal to said second timing means when said capacitor element has charged to a selected voltage.

7. In apparatus according to claim 2, the further improvement comprising an error amplifier component for varying pulses of the oscillator component and wherein said second timing means includes a one-shot timer component in electrical communication with said error amplifier and producing, in response to said second signal, a reducing pulse of a time duration substantially equal to said second period of time, wherein said reducing pulse reduces the error amplifier component output, thereby operating the power supply apparatus in said reduced power output mode.

8. In apparatus according to claim 2, the further improvement comprising an error amplifier component for varying oscillator pulses and wherein said first timing means includes a resistor element, a capacitor element and a switch element, said detection output signal charging said capacitor element through said resistor element, said switch element being in electrical communication with said capacitor element and providing said second signal to said second timing means when said capacitor element has charged to a selected voltage, and wherein said second timing means includes a one-shot timer component in electrical communication with said error amplifier and producing, in response to said second signal, a reducing pulse of a time duration substantially equal to said second period of time, wherein said reducing pulse reduces the error amplifier component output, thereby operating the power supply apparatus in said reduced power output mode.

9. In apparatus according to claim 2, the further improvement wherein the oscillator component has an error amplifier component for controlling oscillator pulses and power supply apparatus power output, and comprising soft start means for initially limiting and subsequently increasing the power delivered to the load upon initial supply of input power to the power supply apparatus, said soft start means being in electrical communication with said error amplifier component and limiting the output of said error amplifier component and therefore the power delivered to the load after initial supply of power to the power control apparatus, said soft start means gradually eliminating said limiting until said initial soft start means no longer affects delivery of power to the load.

10. In apparatus according to claim 9, the further improvement wherein said soft start means includes soft recovery means for reducing the rate at which power is supplied to the load upon return to said first mode of operation upon expiration of said second period of time.

11. In apparatus according to claim 10, the further improvement wherein said soft recovery means includes a soft recovery diode element and said soft start means includes a capacitor element, said soft recovery diode element reducing the charge on said soft start capacitor element during said second period of time.

12. In apparatus according to claim 2, the further improvement wherein said second timing means produces said second period of time to be longer than said first selected period of time.

13. In the apparatus according to claim 2, the further improvement wherein said second timing means produces said second period of time to be at least five times longer than said first period of time.

14. In electrical pulse width modulation apparatus for generating pulses to control the power delivered to a load, said pulses varying in a first mode of pulse width modulator operation in response to at least one feedback signal representative of power delivered to a load, the improvement comprising first means including detection means for detecting when a first signal representative of the power delivered to the load is outside a known range and for producing a detection output signal indicative thereof, said first means further including first timing means, in electrical communication with said detection means and responsive to the duration of said detection output signal, for generating a second electrical signal indicative of said first signal remaining outside said known range for a first period of time, and second timing means, in electrical communication with said first timing means and responsive to said second signal, for reducing the energy of pulses generated by said pulse width modulation apparatus for a second period of time, and for normally returning, after expiration of said second period of time, said pulse width modulation apparatus to said first mode of operation.

15. In apparatus according to claim 14, the further improvement wherein said first timing means includes a resistor element, a capacitor element and a switch element, said detection output signal charging said capacitor element through said resistor element, and said switch element, in electrical communication with said capacitor element, providing said second signal to said second timing means when said capacitor element has charged to a selected voltage.

16. In apparatus according to claim 14, the further improvement comprising an error amplifier component for varying pulses of the oscillator component and wherein said second timing means includes a one-shot timer element in electrical communication with said error amplifier component and producing, in response to said second signal, a reducing pulse of a time duration substantially equal to said second period of time, wherein said reducing pulse reduces the error amplifier component output, thereby operating the power supply apparatus in said reduced power output mode.

17. Electrical power control apparatus for connection to an electrical power source and for controlling the power delivered to load, comprising an oscillator component for generating pulses that vary, in a first mode of power control apparatus operation, in response to at least one feedback signal representative of the power delivered to the load for controlling the power delivered to the load, a feedback component in electrical communication with said oscillator component for generating said at least one feedback signal in response to the power delivered to the load, said feedback signal representative of the power delivered to the load, a switching component responsive to said pulses, said switching component in electrical communication with said oscillator component and with an energy storage component, for switching energy from the power source for storage in said energy storage component, an output conditioning component, in electrical communication with said energy storage component and with the load, for conditioning power drawn from the energy storage component before delivery of the conditioned power to the load, a detection component in electrical communication with said oscillator component for detecting when a first signal representative of the power output of the oscillator component is outside a known range and for producing a detection output signal indicative thereof, a first timing component, in electrical communication with said detection component and responsive to the duration of said detection output signal, for generating a second electrical signal indicative of said first signal remaining outside said known range for a first period of time, and a second timing component, in electrical communication with said first timing means and responsive to said second signal, for operating the power supply apparatus in a reduced power output mode for a second period of time and for normally returning, after expiration of said second period of time, said power supply apparatus to the first mode of operation.

18. Pulse width modulation apparatus for electrical connection to a power supply apparatus and for generating pulses to control the power delivered to a load by the power supply apparatus, said pulse width modulation apparatus comprising

- an oscillator component for generating pulses that vary, in a first mode of pulse width modulation apparatus operation, in response to at least one feedback signal representative of the power delivered to the load for controlling the power delivered to the load,
- a feedback component in electrical communication with said oscillator component for generating said at least one feedback signal in response to the power delivered to the load, said feedback signal representative of the power delivered to the load,
- a detection component in electrical communication with said oscillator component for detecting when a first signal representative of the power delivered to the load is outside a known range and for producing a detection output signal indicative thereof,
- a first timing component, in electrical communication with said detection component and responsive to the duration of said detection output signal, for generating a second electrical signal indicative of said first signal remaining outside said known range for a first period of time, and
- a second timing component, in electrical communication with said first timing element and responsive to said second signal, for reducing the energy of pulses generated by said pulse width modulation apparatus for a second period of time, and for normally returning, after expiration of said second period of time, said pulse width modulation apparatus to said first mode of operation.

19. A method of controlling an electrical oscillator component to limit power dissipation, the oscillator component generating pulses that vary in a first mode of operation in response to at least one feedback signal representative of the power delivered to a load to control the power delivered to the load, said method comprising the steps of

- detecting that a first signal representative of the power output of the oscillator component is outside a selected range and producing a detection output signal indicative thereof,
- generating a second signal, in response to the duration of said detection output signal attaining a first period of time, for indicating that said first signal has remained outside said known range for said first period of time,
- reducing the energy of the pulses generated by the oscillator component for a second period of time, subsequent to said first period of time, in response to said second signal, and
- returning the oscillator component to said first mode of operation, upon expiration of said second selected period of time.

* * * * *